United States Patent [19]
Hekkert et al.

[11] Patent Number: 5,261,453
[45] Date of Patent: Nov. 16, 1993

[54] VALVE PROVIDED WITH SOUND-REDUCING MEANS

[75] Inventors: Ydo M. Hekkert, Oudewater; Hendrik A. Verduyn, Krimpen a/d IJssel, both of Netherlands

[73] Assignee: System Engineering and Components International B.V., Netherlands

[21] Appl. No.: 926,048

[22] Filed: Aug. 5, 1992

Related U.S. Application Data
[63] Continuation of Ser. No. 654,940, Feb. 13, 1991.

[30] Foreign Application Priority Data

Feb. 13, 1989 [NL] Netherlands .......................... 9000339

[51] Int. Cl.⁵ .......................... F16K 47/14; F16K 3/32
[52] U.S. Cl. .......................... 137/625.38; 137/625.3; 137/625.34; 137/614.18; 251/368
[58] Field of Search .......... 137/625.3, 625.32, 625.38, 137/625.34, 614.18

[56] References Cited

U.S. PATENT DOCUMENTS

| | | | |
|---|---|---|---|
| 3,631,891 | 1/1972 | Brumm | 137/625.3 |
| 3,693,659 | 9/1972 | Parola | 137/625.3 |
| 4,102,357 | 7/1978 | Charlton | 137/625.32 |

*Primary Examiner*—Arnold Rosenthal
*Attorney, Agent, or Firm*—Peter L. Michaelson; Raymond R. Moser, Jr.

[57] ABSTRACT

A valve provided with sound-reducing means, which sound-reducing means comprise a porous member.

1 Claim, 7 Drawing Sheets

VALVE PROVIDED WITH SOUND-REDUCING MEANS

CROSS REFERENCE TO RELATED APPLICATION

This application is a continuation of our copending patent application Ser. No. 07/654,940, filed on Feb. 13, 1991 and entitled VALVE PROVIDED WITH SOUND-REDUCING MEANS.

This invention relates to a valve of the flow-shut off type, comprising a valve member adapted to be moved relative to a valve seat for varying the size of a first passage; means for defining a second passage of the valve in series with the first passage, which second passage is so oriented that the flow therethrough occurs radially from within to without; wherein the means defining said second passage comprise a primary member provided with at least one aperture, as well as a secondary member connected to the valve member, which secondary member is adapted to be moved with said valve member for variably clearing or shutting off said at least one aperture; and wherein means are provided for reducing the sound produced by the valve.

Such a valve is known from French patent publication 2,382,639.

The invention also relates to a valve of the flow-opening type.

Hereinafter, the general term "valve" denotes a shut-off valve or control valve, for example. Such a valve may be mounted in a transmission pipe for a liquid or gaseous medium, and serves, for example, for opening or shutting off the pipe, as desired, or for controlling the rate of flow in the pipe while maintaining a fixed pressure on the inlet side or on the outlet side, or a variable pressure on the inlet side and on the outlet side, such that requirements as regards the service of the valve are satisfied. In general, in operation the valve is opened to a greater or lesser extent, with the medium flowing through the passage of the valve under the influence of the pressure difference across this passage. The pressure on the inlet side and on the outlet side of the valve may be determined by external factors, and may therefore be fixed. In the case of transmission of natural gas, for example, the valve may be mounted as a separation between a regional distribution network and an urban network, in which prevail pressures of 40 bara and 8 bara, respectively.

It is well known that in the immediate vicinity of the passage of the valve, very high flow rates may occur as a result of which a very great deal of noise may be produced. In order to reduce the sound load on the surroundings, the known valve is provided with means that partly absorb the sound energy produced in the valve so as to limit the level of the sound emitted to the surroundings. In the known valve, these means have the form of superposed rings of such a form that the fluid, when passing the rings, traverses a curvy path from within to without; the publication refers to "chicanes".

A first disadvantage thereof is that the sound is only damped when it has already been produced.

A further disadvantage is that the free passage of the rings is particularly small, so that they have a reductive influence on the capacity of the valve. In point of fact, in practice this means that in order to obtain in the known valve certain characteristics as regards regulatory capacity, primary pressure, secondary pressure and rate of flow, the entire valve, i.e. the combination of valve member, primary member, secondary member and sound-absorbing rings, must be designed for such characteristics. Already many valves not as yet provided with sound-reducing means are used, in which the noise caused by high flow rates has been accepted so far. However, there is a need for these existing valves to be adapted so as to meet increasingly stricter environmental requirements as regards sound-production, while, of course, the original characteristics of the valve must be maintained or changed only to a very limited extent. This is not possible with the rings referred to: either only a minor sound-damping effect is attained with an acceptable deviation from the original characteristics or an acceptable sound-damping effect is attained with an unacceptable deviation from the original characteristics.

It is therefore a general object of the present invention to improve the known valve.

It is a particular aim of the present invention to construct a valve such that the flow rates and/or turbulencies occurring in the valve have an acceptable amplitude and/or frequency, so that the level of the sound produced is reduced. It is a further object of the invention to provide for a more efficient damping of the sound that is nevertheless produced.

It is yet a further object of the invention to provide means suitable for use in already existing valves for providing therein for a proper sound-reduction while maintaining the original characteristics as much as possible.

The that effect, according to the invention the sound-reducing means comprise a porous member. Preferably, the porous member is at least partly made of metal foam, because this offers the advantage of a light weight, great strength and a large relative passage area.

It has been found that by virtue of the features of the invention the flow rates are particularly well limited and a particularly good limitation of the turbulencies and the wear and sound caused thereby is obtained, when the consistency and dimensions of the porous member are chosen such that when the valve is at least partly opened, the following invariably applied:

$$P1/P2 < P2/P3$$

wherein
P1 is the inlet pressure,
P2 is the pressure between the two passages, and
P3 is the outlet pressure.

In a particularly effective embodiment of the valve according to the invention, the porous member and the primary member are formed as one whole, so that the apertures of the primary member are defined by the porosity of the porous member. Thus, on the one hand, a saving of costs is achieved, and, on the other, it is achieved that the expansion takes place in the porous member as much as possible.

It is also an object of the invention to improve a valve of the flow-opening type by providing it with particularly efficient sound-reducing means. According to the invention, such a valve, which comprises a valve member adapted to be moved relative to a valve seat for varying the size of a first passage, with the flow therethrough occurring radially from within to without, comprises a porous member arranged around the valve member, which porous member is preferably made, at least in part, of metal foam.

It is a further object of the invention to provide a porous member which is suitable for functioning as a particularly efficient sound damper in already existing valves.

Hereinafter, the invention will be further explained by description of preferred embodiments, with reference to the accompanying drawings, in which.

Figure 2:
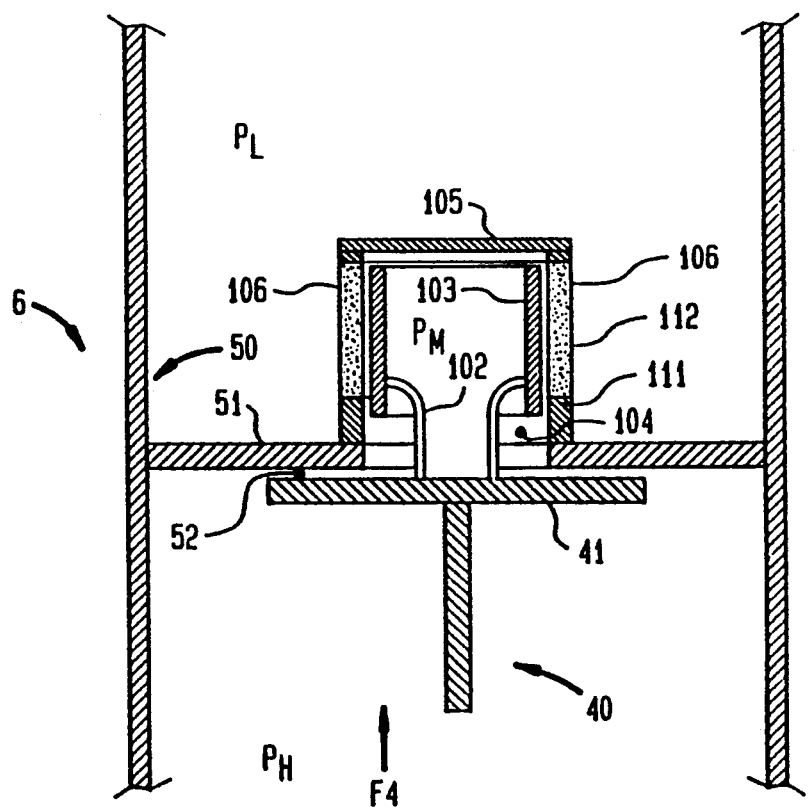
FIG. 2 is a diagrammatic sectional view of a second embodiment of a flow-shut off valve according to the invention.
Figure 3A:
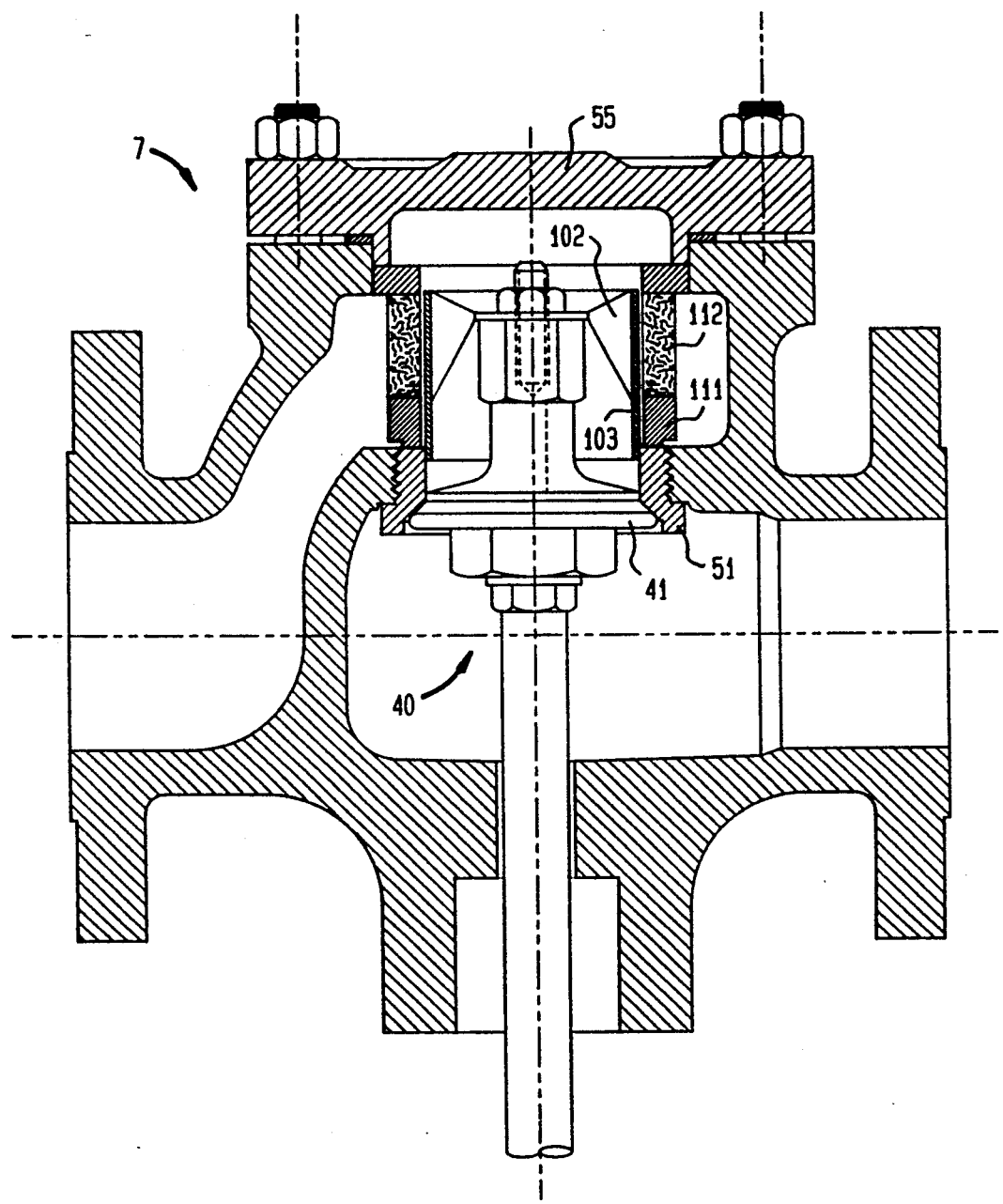
Figure 3B:
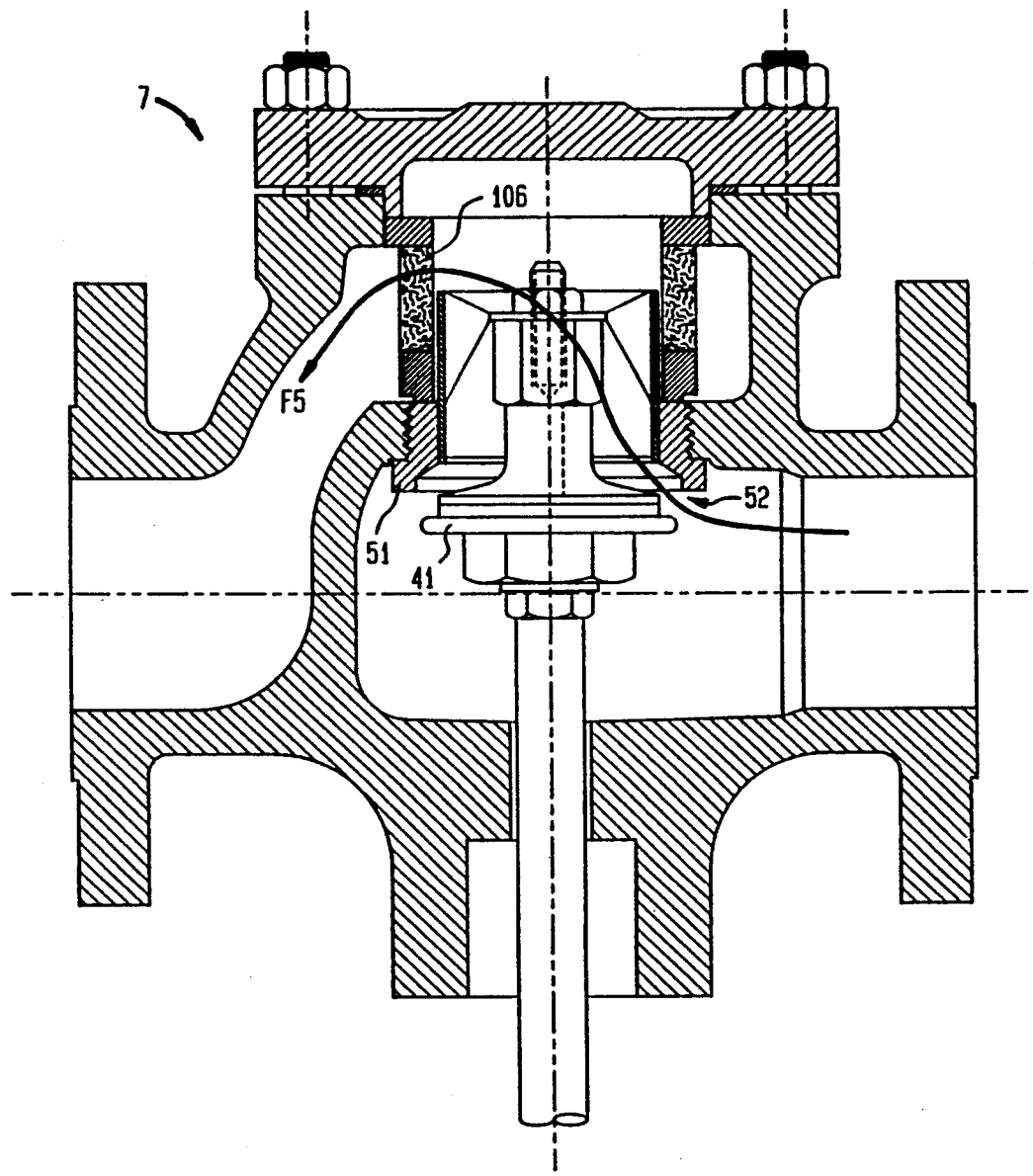
Figure 4A:
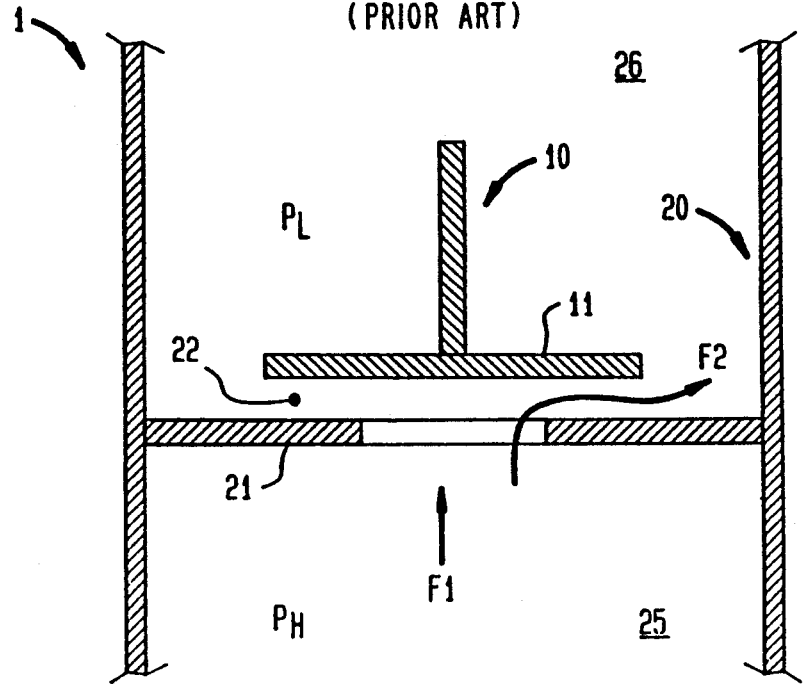
Figure 4B:
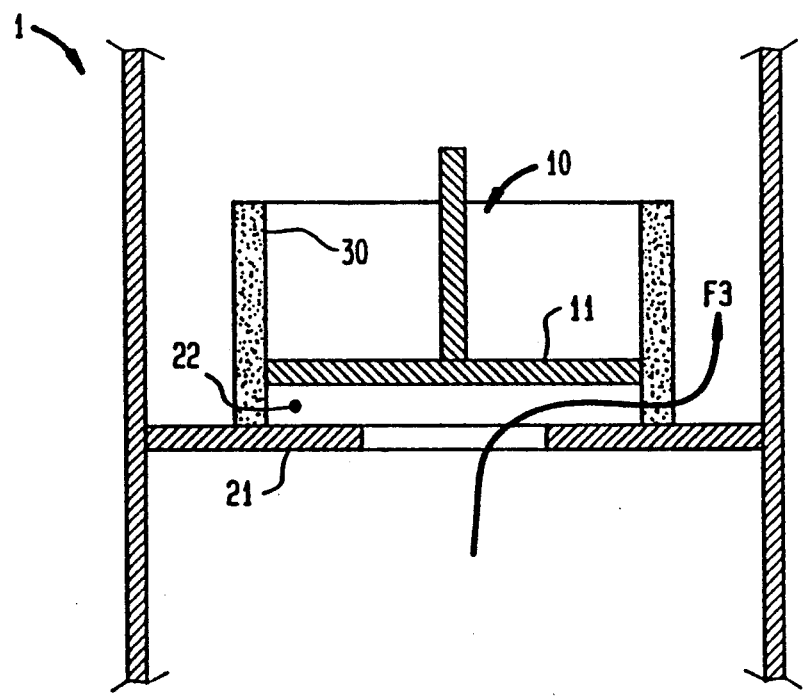
Figure 5A:
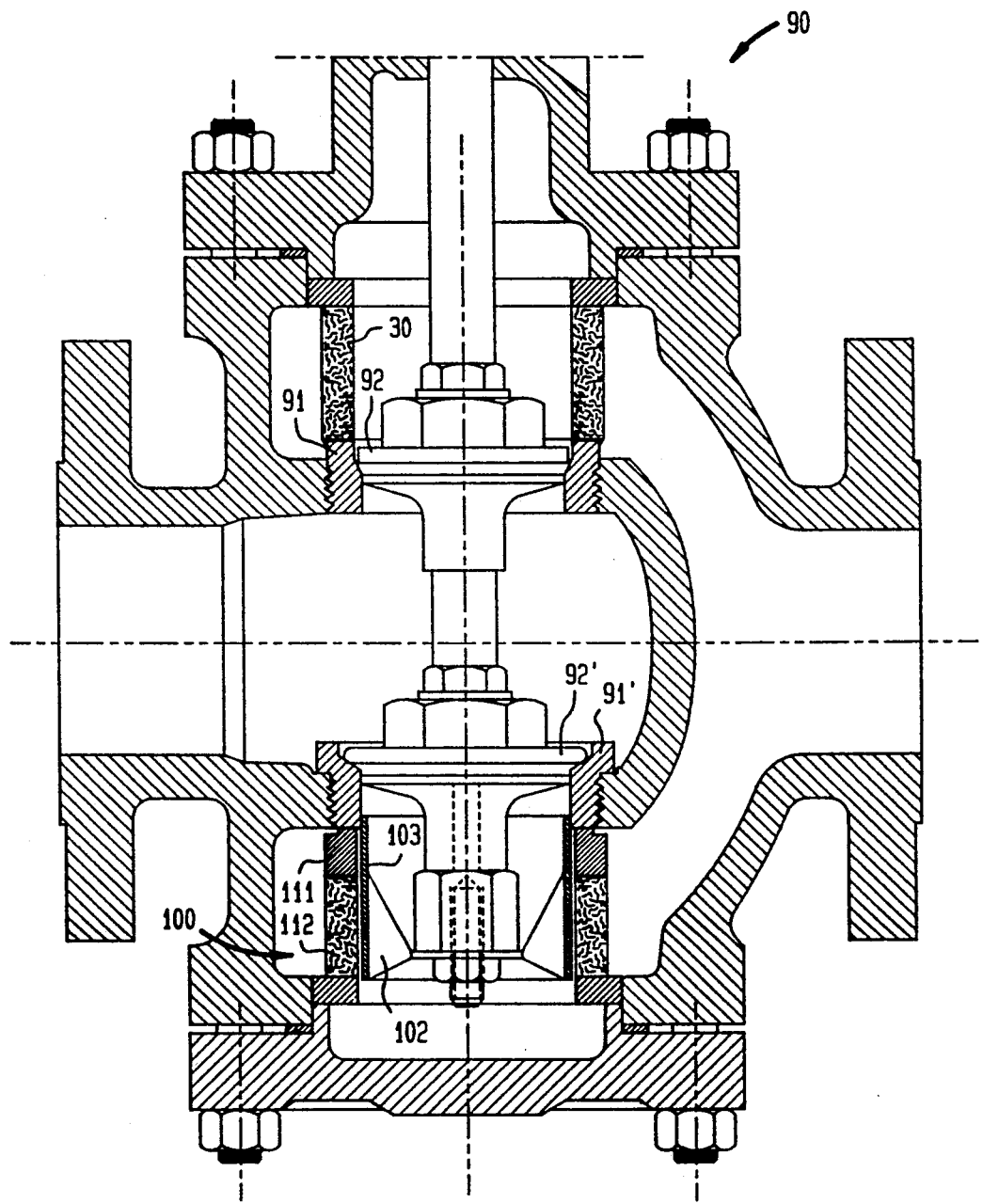
Figure 5B:
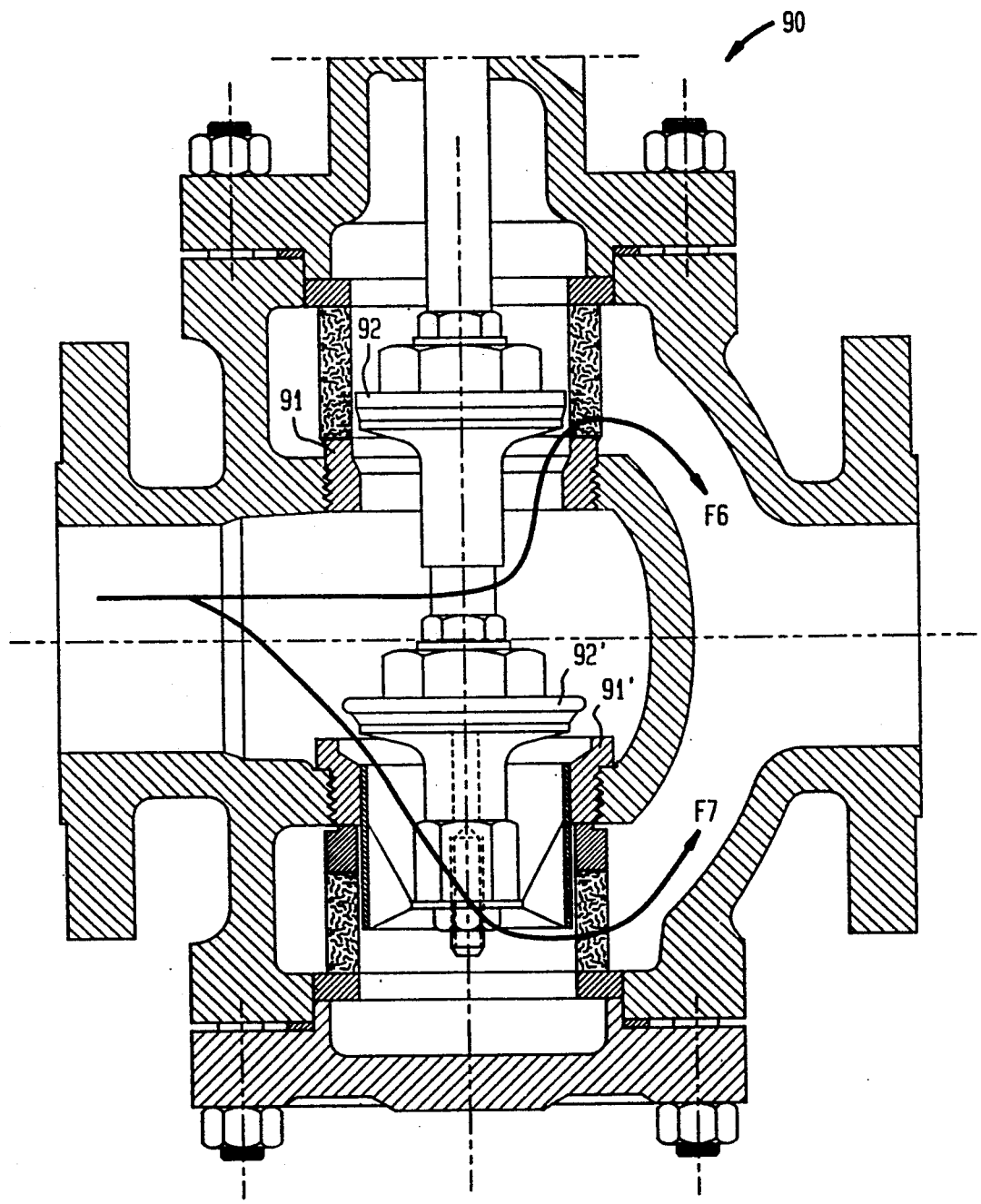

FIGS. 3A-B illustrate in section a practical embodiment of the valve of FIG. 2, in a closed (A) and a partly opened (B) position, respectively;

FIG. 4A is a diagrammatic sectional view of a known flow-opening valve;

FIG. 4B is a diagrammatic sectional view of the valve of FIG. 4A, provided with a sound-reducing member according to the invention;

FIGS. 5A-B illustrate in section another embodiment of a valve according to the invention, in a closed (A) and partly opened (B) position, respectively.

Hereinafter, first a valve of the flow-shut off type improved in accordance with the invention will be discussed. The term "flow-shut off type" denotes that the force exerted on the valve member by the flow of the medium tends to diminish the size of the passage. Such a flow-shut off design has the advantage over a flow-opening design that in the closed position of the valve the force exerted by the pressure of the medium tends to keep the valve closed, which may be desirable from considerations of safety.

Figure 1:
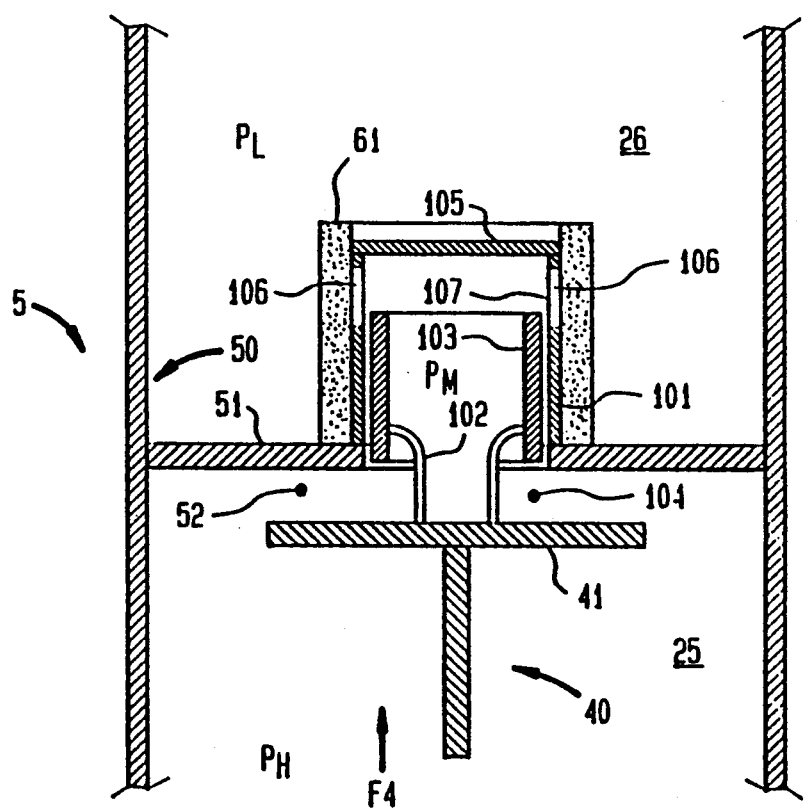
FIG. 1 is a diagrammatic sectional view of a flow-shut off valve according to the invention in a partly opened position.

FIG. 1 diagrammatically shows a first embodiment of a flow-shut off valve according to the invention generally designated by the reference numeral 5, comprising a valve member 40 and a valve housing 50. By way of example, the valve 5 is designed as a disk 41 adapted for axial displacement relative to an annular valve seat 51, the axial distance between the valve seat 51 and the disk 41 defining the size of a first passage 52. The valve 5 is connected to an inlet pipe 25 for supplying a fluid medium to the valve 5 and an outlet pipe 26 for discharging a fluid medium from the valve 5. The direction of flow of the medium through the valve 5 is indicated by the arrow F4.

Provided in series with the first passage 52 is a second passage 106 defined by a primary member 101 provided with at least one aperture 107 and a secondary member 103 connected to the valve member 40 by means of fastening means 102, which secondary member 103 is adapted to be moved with the valve member 40 for variably clearing or shutting off said at least one aperture. The primary member 101 and the secondary member 103 are preferably of circular cylindrical configuration, as shown in FIG. 1, and the second passage is oriented in such a way that the flow therethrough occurs substantially radially from within to without.

In the inlet pipe 25 the medium has a comparatively high pressure $P_H$, and in the outlet pipe 26 the medium has a comparatively low pressure $P_L$. Between the first passage 52 and the second passage 106 prevails an intermediate pressure $P_M$ which is lower than the inlet pressure $P_H$ of the valve 5 and which is higher than the outlet pressure $P_L$ of the valve 5. When the medium flows through the valve 5, a transition takes place from the comparatively high pressure $P_H$ to the comparatively low pressure $P_L$, so that the medium expands, the magnitude of expansion depending upon the type of medium and upon the state of the medium. With such an expanding medium, problems may be encountered, such as excessive sound production caused by a locally excessive flow rate or turbulence, the largest sound production occurring at the outlet side of the aperture in question.

Further, a cylindrical porous member 61 is mounted around the primary member 101. The porous member 61 may appropriately be made of coiled gauze, but preferably the porous member 61 is made of metal foam, since this has a light weight, a great strength and great permeability. The size of the mesh and wire of the gauze, or the consistency of the metal foam, can be adapted to the medium that is to flow through the member 61, the corresponding flow rates, etc. If desired, a support cage (not shown) may be provided around the porous member 61 for increasing the strength of the porous member 61.

The porous member 61 is disposed in the immediate vicinity of the second passage 106, and on the outlet side thereof, so that the medium expanding upon passage of the aperture 106 in the primary member 101 is forced to pass the member 61 directly upon said passage. It will also be clear that the size of the passage area of the member 61 varies with the position of the valve member—namely, proportionately to the size of the portion of the aperture 106 that has been cleared by the secondary member 103.

Between the secondary member 103 and the valve member 41, preferably, as shown in FIG. 1, an axial space 104 is left clear, whose axial size corresponds at least to the maximum height of the passage 52.

On the side remote from the passage 52, the primary member 101 is provided with a closed end wall 105. The apertures 107 referred to are disposed in the vicinity of the end wall 105, preferably at a minor distance therefrom. The axial size of these apertures 107 is at least as large as said maximum height of the passage 52.

In a closed service position (not shown) of the valve 5, the disk 41 of the valve member 40 closes off the passage 52 completely. No flow occurs then. The secondary member 103 closes off the apertures 107 in the primary member 101 virtually completely. A small residual opening or leakage opening however is maintained to ensure that the shut off function of the valve is performed by the combination of disk 41 and valve seat 51 designed for that purpose.

FIG. 1 shows the valve 5 in an open service position with the passage 52 being partially cleared by the valve member 40. In the transition from the closed service position to the open service position, the secondary member 103 can clear the apertures 107 in the primary member 101 simultaneously with the clearance of the passage 52 by the valve member 40, but preferably the construction is such that the apertures 107 in the primary member 101 are in fact cleared somewhat later by the secondary member 103 than the clearance of the passage 52 by the valve member 40. Thus it is achieved that the main pressure drop occurs across the apertures 107 in the primary member 101. It is observed that the secondary member 103 does not function as a valve relative to the primary member 101, since there is a certain clearance between the wall of the secondary member 103 and the wall of the primary member 101. Owing to the fact that the main pressure drop occurs across the apertures 107 in the primary member 101, it is achieved that during the passing of the first passage 52 comparatively little sound is produced. Upon passage of the apertures 107, the medium expanding after and at the apertures 107 is given more and more space, viewed in the direction of flow, and further the expanding medium is forced to pass the porous member 61, with the flow being divided into a great number of substreams of substantially laminar flow, whereby the production of sound is prevented as much as possible. The sound that is produced nevertheless, whose level, as it is, is lower compared with the level of the sound produced by the known valve, is further damped by the presence of the porous member, which damping takes place particularly effectively, so that in all a particularly low sound level is emitted to the environment compared with the sound level emitted to the environment by the known valve.

It is observed in this connection that pressure drop herein refers to the relative pressure drop and not to the absolute pressure drop. When, for example, the inlet pressure $P_H$ is 40 bara and the outlet pressure $P_L$ is 8 bara, and the dimensioning is such that the intermediate pressure $P_M$ is 20 bara, then the absolute pressure drop across the passage 52 is 20 bara and the absolute drop across the apertures 107 is 12 bara, so that the absolute pressure drop across the apertures 107 is smaller than the absolute pressure drop across the passage 52. The relative pressure drop across the passage 52, however, is a factor 2 (40 bara:20 bara), while the relative pressure drop across the apertures 107 is a factor 2.5 (20 bara:8 bara), and hence is greater than the relative pressure drop across the passage 52.

It will be clear that in the valve 5 shown in FIG. 1, upon variation of the axial position of the valve member 41, the size of such portion of the second passage 106 in the primary member 101 as is cleared by the secondary member 103, varies substantially proportionally to the size of the passage 52 between the valve member 41 and the valve seat 51. Thus it is achieved that the relative pressure drop across the passage 52 and the relative pressure drop across the opening 106 remains substantially constant.

FIG. 2 shows a preferred embodiment of a valve according to the invention, generally designated by the reference numeral 6, which is comparable with the valve 5 but in which the function of the primary member 101 and the additional member 61 is performed by a single member, by virtue of the fact that a cylindrical primary member 111 is at least partly (112) of a porous nature, and is preferably made of metal foam. In other words, the primary member 111 has, as it were, an integrated sound-reducing member 112. The cleared portion of the apertures 106 is defined by such portions of the porous wall sections 112 of the primary member 111 as have been cleared by the secondary member 103. The porous side wall sections 112 may extend axially and/or tangentially over a portion of the side walls of the primary member 111.

An advantage of the embodiment shown in FIG. 2 is a simplified construction compared with the embodiment shown in FIG. 1. Another advantage is an improved functioning because in the valve 6 shown in FIG. 2, the expanding medium immediately reaches the porous member 112, while in the valve 5 shown in FIG. 1 the expanding medium can move across the thickness of the primary member 101 before reaching the porous member 61.

It is stressed that FIGS. 1 and 2 may illustrate an entirely new-made valve according to the invention. As noted above, the valve 6 of FIG. 2 is preferable, wherein in a particularly simple embodiment the primary member 111 is entirely porous.

However, FIGS. 1 and 2 may also illustrate an existing valve which has been improved according to the invention by mounting a sound-reducing member according to the invention. In that case, FIG. 1 may illustrate a valve consisting of a valve member 40 and a valve housing 50, comprising a primary member 101 and a secondary member 103 so as to obtain a stepped pressure drop, which valve has been improved in accordance with the invention by mounting a porous member 61, such as a cylinder made of metal foam, around the primary member 101. FIG. 2 may then illustrate a valve consisting only of a valve member 40 and a valve housing 50, which has been improved in accordance with the invention by mounting a secondary member 103 on the valve member 40 and providing a primary member 111, 112 around it. In that case it is preferable for the primary member to consist of two separate segments 111 and 112, optionally secured to each other, for example by soldering or glueing. This offers the advantage that the porous segment 112 may have standard dimensions, and that the dimensions of the segment 111 can be adjusted to the valve to be improved: the segment 111 then functions as a spacer ring.

FIGS. 3A-B are sectional views of a valve 7 which is a practical embodiment of the valve 6 shown in FIG. 2, in a closed and a partly opened axial position of the valve member 40, the course of the flow being indicated by the arrow F5. The valve housing 50 is provided with a detachable cover 55, via which the primary member 111, 112 can be mounted or removed in a simple manner, so that maintenance of the valve, and possibly necessary replacement of the porous member 112 as a result of contamination, for example, can take place in a simple manner. The cover 55 also functions as end wall 105.

FIG. 4A is a diagrammatic sectional view of a known valve of the flow-opening type, generally indicated by the reference numeral 1, comprising a valve member 10 and a valve housing 20. By way of example, the valve 1, too, is formed as a disk 11 adapted for axial movement relative to an annular valve seat 21, with the axial distance between the valve seat 21 and the disk 11 defining the size of the first passage 22. The valve 1 is further connected to an inlet pipe 25 and an outlet pipe 26, and the direction of flow of the medium through the valve 1 is indicated by the arrow $F_1$.

In FIG. 4B, the known valve 1 has been improved by providing it, in accordance with the invention, with a soundreducing porous member 30. The additional member 30 has a cylindrical configuration and is made of metal foam, for example. The member 30 is arranged coaxially with the disk 11 of the valve member 10 with only a very small radial clearance. As will be clear from FIG. 4B, in this manner the medium flowing from the passage 22 is forced to flow through the member 30 (see arrow $F_3$) immediately after passing from the passage 22, as described with reference to the porous member 112. It will also be clear that upon changing the axial position of the valve member 10, the flow-through area of the member 30 will vary accordingly.

FIGS. 5A-B show another possible embodiment of a valve 90 according to the invention, in a closed (FIG. 5A) and partly opened (FIG. 5B) position of the valve 90, respectively. The valve 90 is of the double-seat type.

The flow is divided into two parallel streams, indicated by the arrows F6 and F7, through two first passages in parallel arrangement, each with a valve seat 91, 91' and a valve member 92, 92', with the one first passage between the valve seat 91 and the valve member 92 being passed in a flow-opening manner (F6) and the other first passage between the valve seat 91' and the valve member 92' being passed in a flow-shut off manner (F7). A consequence of this is that the net force exerted by the flow of the medium on the valve members 92, 92' is virtually nil. In the double-seat valve 90 shown in FIGS. 5A-B, the flow-opening valve is provided with a sound-reducing porous member 30 consisting of a cylinder of metal foam, and the flow-shut off valve is provided with a sound-reducing device 100 which comprises a primary member 111 with a porous section 112 and a secondary member 103, as discussed with reference to FIG. 2.

It will be clear that the invention is not limited to the embodiments shown in the drawings, but that it will be possible for anyone skilled in the art to make changes and/or modifications which fall within the scope of the invention. For example, it is possible that the primary member which, in the examples, has been shown as being rigidly connected to the valve housing, can also be moved, in a direction that may or may not be opposite to that of the secondary member.

We claim:

1. A flow opening type valve comprising:
   a valve body having a valve seat;
   a valve member adapted to be moved relative to the valve seat and the valve body, wherein a separation between the valve seat and the valve body collectively defines a single passage being an annular opening surrounding an axis of the valve, the single passage being oriented such that flow therethrough occurs in a radial direction from inside of said first passage to outside thereof with respect to said axis of the valve; and
   a porous metallic foam member situated directly adjacent to said single passage.

* * * * *